UNITED STATES PATENT OFFICE.

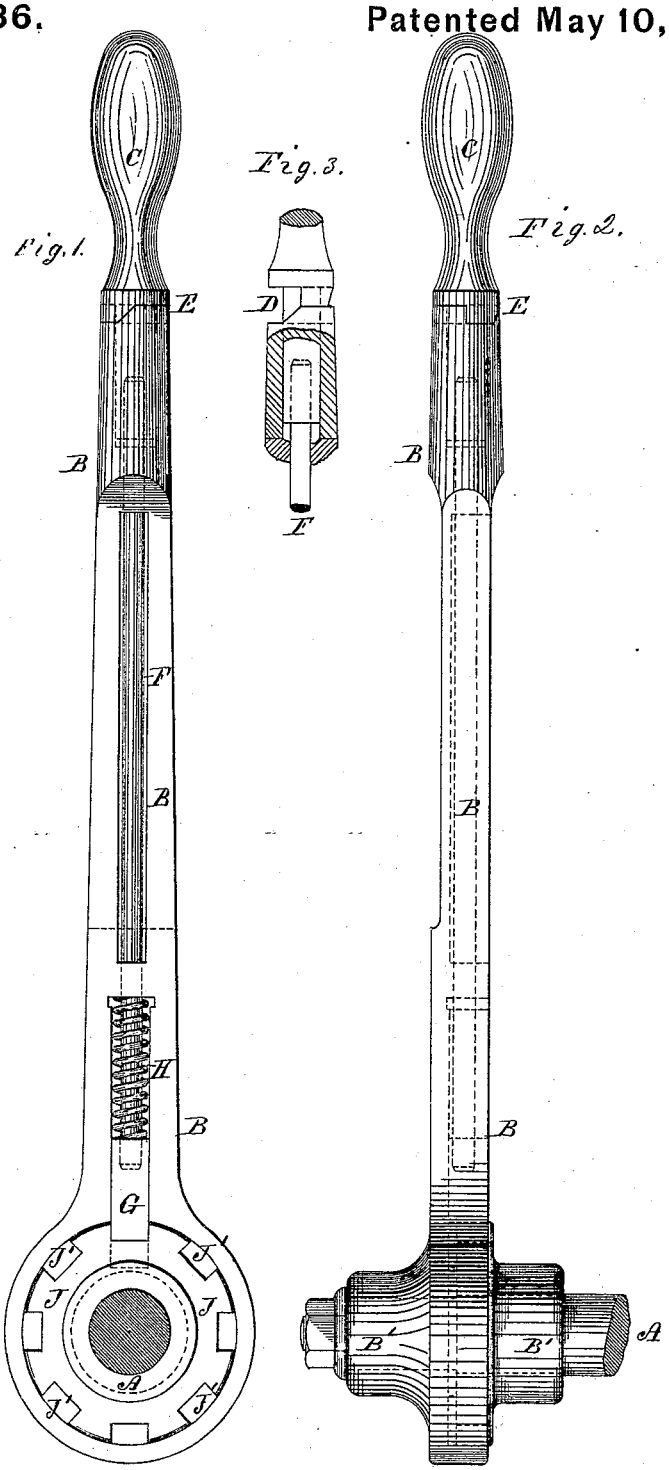

FRANCIS A. PRATT, OF HARTFORD, CONNECTICUT, ASSIGNOR TO THE PRATT & WHITNEY COMPANY, OF SAME PLACE.

ADJUSTABLE LEVER.

SPECIFICATION forming part of Letters Patent No. 241,236, dated May 10, 1881.

Application filed January 15, 1881. (No model.)

*To all whom it may concern:*

Be it known that I, FRANCIS A. PRATT, of Hartford, in the county of Hartford and State of Connecticut, have invented certain new and useful Improvements in Adjustable Levers; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention relates to levers attached to a rotating shaft for the purpose of giving it any desired amount of movement by hand, and it is more especially adapted to such shafts or arbors as are first set in some position at the commencement of a mechanical operation and are then farther advanced by hand, and where it is an advantage to have the lever in a position approximately the same with relation to the operator, whatever may be the position of the shaft—for example, in drilling-machines where the shaft is revolved until the drill touches the work, and afterward is slowly moved by the lever as the drill penetrates.

The object of my invention is to provide a simple and easily-operated device for setting and holding the lever in any radial direction relative to the shaft.

In the accompanying drawings, illustrating my invention, Figure 1 is a front view of my improved lever attached to a shaft, partly cut away, so as to show the interior parts. Fig. 2 is a side view of the lever attached to the shaft, with the interior parts shown in dotted lines. Fig. 3 is a sectional view of the upper end of the lever, with the handle lifted by rotating.

A is the shaft.

B is the lever. It has bearings B' fitting and turning upon the shaft A.

C is the handle of the lever. It has a strong stem, D, fitting into a socket in the body of the lever B, and arranged so as to slide in or out.

E is a cam-joint, between the handle C and the body B. This is arranged around the circumference of the stem D, so that when the handle is turned through a small angle the parts of the cam moving upon each other force the handle outward into the position shown in Fig. 3.

F is a rod or stem, connecting the part D with the plug G, and which moves up and down in bearings in the lever B. The part F is screwed into D and G, and the three parts form one bar, moving up and down in the interior of the lever.

H is a spiral spring, lying in a socket in B, and acting downward upon the plug G.

J is a notched disk, keyed upon the shaft A, and furnished with the notches J', into which the plug G fits to bolt the lever and disk together.

The operation of my invention is as follows: When the shaft A has been placed in any position, and it is desired to set the lever where it can be most conveniently operated, the handle C is grasped and turned slightly to the right. This lifts the plug G out of one of the notches J'. The lever can now be turned to the proper position, when the handle is turned back to its first position, allowing the plug to enter one of the notches J' when it comes opposite to it. The lever can thus be stopped and held opposite to the notch nearest to the desired position.

What I claim as my invention is—

1. The combination of the rotating handle C and the lever B, provided with the cam-surface E between them, and adapted to raise the plug G, with a locking device upon a rotating shaft, substantially as described.

2. The combination of the lever B, the handle C, with its stem D, the rod F, the plug G, the spring H, and the notched disk J, fixed upon the shaft A, substantially as described.

F. A. PRATT.

Witnesses:
 THEO. G. ELLIS,
 WILMOT HORTON.